(12) United States Patent
DeLuca et al.

(10) Patent No.: US 10,397,745 B2
(45) Date of Patent: *Aug. 27, 2019

(54) TARGETING NOTIFICATIONS INTENDED FOR DRIVERS TO A TRUSTED AUTOMOBILE PASSENGER

(71) Applicant: International Business Machines Corporation, Armonk, NY (US)

(72) Inventors: Lisa Seacat DeLuca, Baltimore, MD (US); Jeremy Adam Greenberger, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/993,736

(22) Filed: May 31, 2018

(65) Prior Publication Data

US 2018/0288574 A1 Oct. 4, 2018

Related U.S. Application Data

(63) Continuation of application No. 15/398,920, filed on Jan. 5, 2017, now Pat. No. 10,045,157.

(51) Int. Cl.
*H04W 48/06* (2009.01)
*H04M 1/60* (2006.01)
(Continued)

(52) U.S. Cl.
CPC ......... *H04W 4/027* (2013.01); *H04M 1/7253* (2013.01); *H04M 1/72519* (2013.01);
(Continued)

(58) Field of Classification Search
CPC ............................ H04W 48/06; H04M 1/6091
See application file for complete search history.

(56) References Cited

U.S. PATENT DOCUMENTS

| 8,952,800 B2 | 2/2015 | Bantz et al. |
| 9,010,482 B2 | 4/2015 | Motoyama |

(Continued)

OTHER PUBLICATIONS

Mariakakis A. et al., "WatchUDrive: Differentiating Drivers and Passengers Using Smartwatches", The Second IEEE International Workshop on Sensing Systems and Applications Using Wrist Worn Smart Devices, (4 pages) (2016).

(Continued)

*Primary Examiner* — Christopher M Brandt
(74) *Attorney, Agent, or Firm* — Scully, Scott, Murphy & Presser, P.C.; Robert J. Shatto, Esq.

(57) ABSTRACT

Systems and methods for redirecting notifications, including determining that a first mobile device is in motion at a speed that exceeds a threshold value; determining that the while the first mobile device is in motion at a speed that exceeds the threshold value, the first mobile device is within a threshold distance of the second mobile device; determining, from an input received by the first mobile device that the first mobile device is in a position of a driver of an automobile; determining that a second mobile device is in a position of a passenger of the automobile; and automatically transmitting the notification from the first mobile device to the second mobile device, without providing an indication to a user of the first mobile device that the notification was received by the first mobile device.

17 Claims, 4 Drawing Sheets

(51) Int. Cl.
*H04W 4/02* (2018.01)
*H04M 1/725* (2006.01)
*H04W 68/00* (2009.01)
*H04W 4/021* (2018.01)
*H04W 76/14* (2018.01)

(52) U.S. Cl.
CPC ....... *H04M 1/72577* (2013.01); *H04W 4/021* (2013.01); *H04W 68/005* (2013.01); *H04W 76/14* (2018.02); H04M 2250/10 (2013.01); H04M 2250/12 (2013.01)

(56) References Cited

U.S. PATENT DOCUMENTS

| | | | |
|---|---|---|---|
| 9,020,482 | B2 | 4/2015 | Jones |
| 9,311,271 | B2* | 4/2016 | Wright .................. G07C 5/008 |
| 9,313,626 | B2 | 4/2016 | Shuster |
| 9,324,121 | B2 | 4/2016 | Osann, Jr. |
| 9,326,089 | B2 | 4/2016 | Xia et al. |
| 9,338,300 | B2 | 5/2016 | Tadayon et al. |
| 9,338,605 | B2 | 5/2016 | Guba et al. |
| 2010/0323657 | A1* | 12/2010 | Barnard ................ H04M 1/663 455/404.1 |
| 2011/0105097 | A1* | 5/2011 | Tadayon ................ H04W 4/50 455/418 |
| 2013/0035117 | A1 | 2/2013 | Litkouhi et al. |
| 2014/0028542 | A1 | 1/2014 | Lovitt et al. |
| 2015/0127215 | A1* | 5/2015 | Chatterjee ............ H04W 4/046 701/36 |
| 2015/0223032 | A1 | 8/2015 | Nespolo et al. |
| 2015/0341290 | A1 | 11/2015 | Cherifi et al. |
| 2015/0358471 | A1* | 12/2015 | Roth ...................... B60K 37/00 455/417 |
| 2015/0373479 | A1* | 12/2015 | Xia ........................ H04W 4/70 455/420 |
| 2016/0044575 | A1 | 2/2016 | Rajeevalochana et al. |
| 2016/0105840 | A1 | 4/2016 | Smiley et al. |
| 2017/0238174 | A1* | 8/2017 | Cech ...................... H04W 4/80 455/411 |

OTHER PUBLICATIONS

Owens J.M. et al., "Driver Performance While Text Messaging Using Handheld and In-Vehicle Systems", Accident Analysis and Prevention 46:939-947 (2011).
Verizon Internet Article, http://www.verizonwireless.com/archive/mobile-living/home-and-family/apps-to-block-text (14 pages) (2017).
Spy on Any Mobile Phone or Tablet Right Now! Internet Article, http://myspyapp.org/ (4 pages) (2017).
Internet Article, http://cdn.bgr.com/2016/01/faraday-future-steering-wheel.jpg?w=624 (1 page) (2017).
Wallen J., "Easily Forward Calls and SMS on Android Phones", http://www.techrepublic.com/blog/smartphones/easily-forward-calls-and-sms-on-android-p . . . , Internet Article, (12 pages) (2017).
Internet Article, "Forward SMS Texting W/2Phones", https://play.google.com/store/apps/details?id=com.mysms.android.mirror@hl=en (3 pages) (2017).
List of IBM Patents or Patent Applications Treated As Related Dated May 31, 2018, 2 pages.

* cited by examiner

TARGETING NOTIFICATIONS INTENDED FOR DRIVERS TO A TRUSTED AUTOMOBILE PASSENGER

BACKGROUND

The present application relates generally to computers, and computer applications, and more particularly to computer-implemented methods to provide notifications intended for a driver to a trusted automobile passenger.

The presence and use of mobile devices and their messaging capabilities has increased the number of automobile accidents. One cause of the increase in the number of automobile accidents is the distraction of a driver caused by an incoming notification. This notification can include a sound, a vibration, a flash of light, the screen of the mobile device illuminating or a combination of these features and can cause the driver to divert their focus to the mobile device.

Although the receipt of notifications can be blocked by the driver, many drivers do not utilize these features. Also, to their detriment, driver's desire knowledge of an incoming notification and the information associated therewith without delaying until the completion of the driving trip.

Typical systems and methods for blocking receipt of notifications completely prevent receipt of a notification by the driver, or anyone else in the automobile.

BRIEF SUMMARY

One embodiment of a computer implemented method for redirecting notifications, includes determining that a first mobile device is in motion at a speed that exceeds a threshold value; determining that the while the first mobile device is in motion at a speed that exceeds the threshold value, the first mobile device is within a threshold distance of the second mobile device; determining, from an input received by the first mobile device that the first mobile device is in a position of a driver of an automobile; determining that a second mobile device is in a position of a passenger of the automobile; pairing the first mobile device with the second mobile device in response to the first mobile device being determined as being in a position of the driver and in response to the second mobile device being in the position of the passenger; determining that a notification has been received by the first mobile device; and automatically transmitting the notification from the first mobile device to the second mobile device, without providing an indication to a user of the first mobile device that the notification was received by the first mobile device.

A system that includes one or more processors operable to perform one or more methods described herein also may be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The disclosure is directed to a computer system and computer-implemented method to provide notifications intended for a driver's mobile device to a trusted automobile passenger's mobile device. Although the term automobile is used throughout this application, the term automobile is meant to include any vehicle that is capable of transporting a driver and a passenger, including aircraft, trains and marine vehicles.

Figure 1:
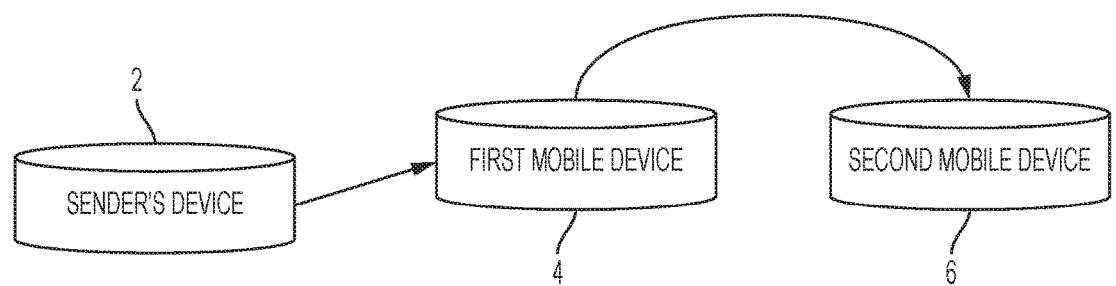
FIG. 1 is a general overview of the method according to an embodiment of the present disclosure.

FIG. 1 depicts an overview of a method of an embodiment of the present disclosure. In this figure a sender has a sender's device 2. Sender's device 2 can be operated by a person or service (such as Twitter®) that sends a notification to a recipient's mobile device 4 (first mobile device). This notification can be a text message or an application message (such as from Twitter®), for example. In this embodiment the recipient is driving an automobile, with the first mobile device 4 also in the automobile. In the same automobile a passenger's mobile device 6 (second mobile device) is present. The first mobile device 4 is configured to recognize when it is moving in an automobile and automatically routes the notification, without providing any indication to the recipient, to second mobile device 6.

The passenger can then optionally, verbally inform the driver of the notification's contents. The passenger can also optionally respond to the sender directly with another notification or other form of communication including a phone call. The response from the second mobile device 6 to sender's device 2 can also include a message that the response is being sent on behalf of the driver.

A further description of the method overview of FIG. 1 is discussed below.

Figure 2:
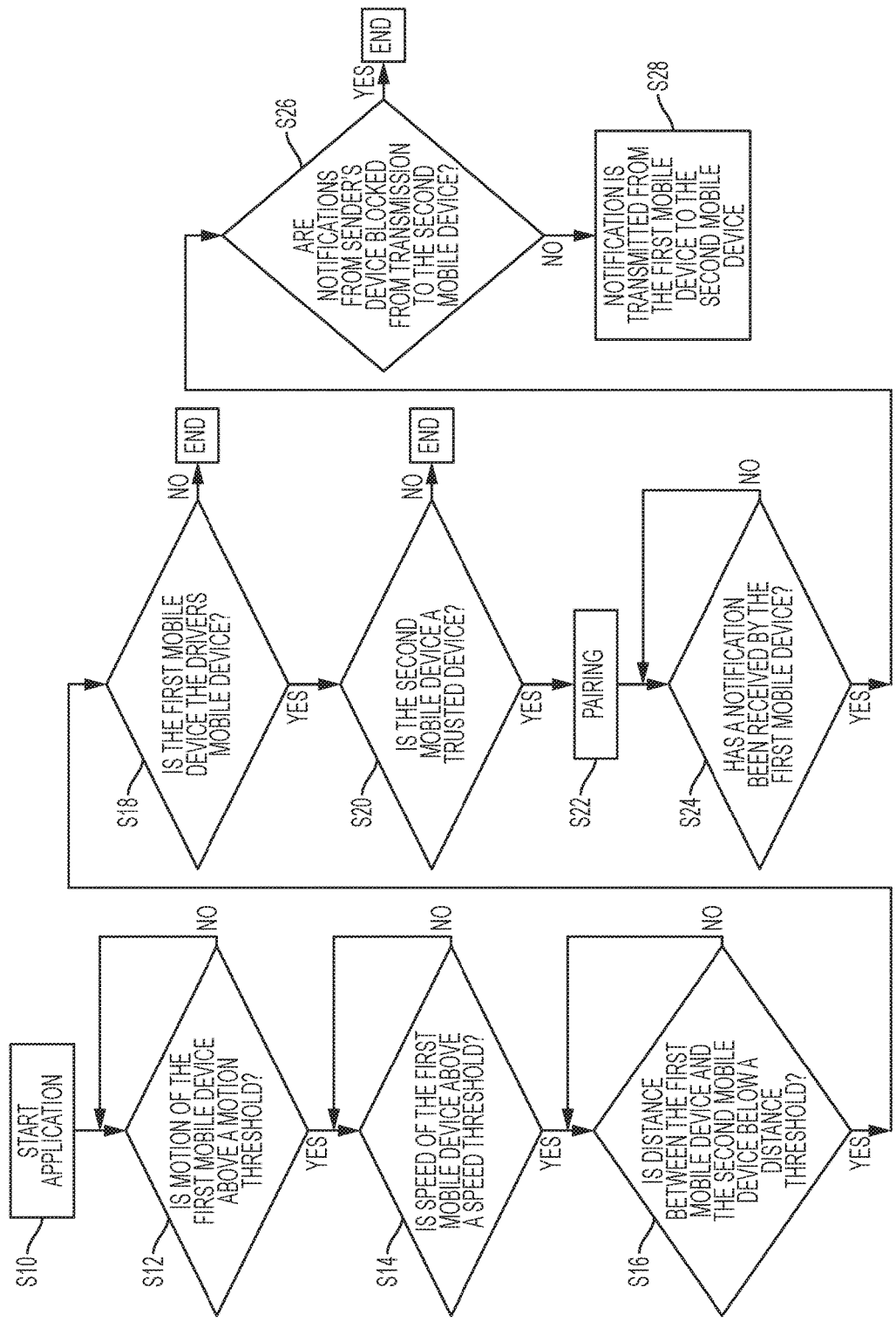
FIG. 2 is a flowchart including several steps of the method according to an embodiment of the present disclosure.

FIG. 2 is a flowchart including several steps of the disclosed method. In step S10, an application or other program begins operating on the first mobile device (4 of FIG. 1). This application or other program is configured to complete the following steps of FIG. 2.

Next, in motion detection step S12, the first mobile device (4 of FIG. 1) determines whether the device is in motion and the extent of the motion using any suitable sensor (such as an accelerometer) or reliance on GPS signals. If the motion is not above a motion threshold, the method loops back and makes another determination, if the motion is above a motion threshold, the method continues to the next step, speed detection step S14. The threshold is set to make the determination that the device is in a moving vehicle as opposed to on the person of a user that is walking.

In speed detection step S14, the first mobile device (4 of FIG. 1) determines its speed using any suitable sensor (such as an accelerometer) or reliance on GPS signals. If the speed is not above a speed threshold, the method loops back and makes another determination, if the speed is above a speed threshold, the method continues to the next step, distance determination step S16.

Optionally, one or both of motion detection step S12 and speed detection step S14 can include a time determination threshold for maintaining motion below the motion threshold for a period of time and/or for maintaining a speed below the speed threshold for a period of time. For example, if the automobile is stopped at a red light for ten seconds, and the time determination threshold is fifteen seconds, the method will not loop back and will proceed with blocking notification to the first mobile device as discussed below.

In distance determination step S16, the distance between the first mobile device (4 of FIG. 1) and the second mobile device (6 of FIG. 1) is determined using any suitable sensor (such as a Near Field Communication (NFC) sensor) or reliance on GPS signals. If the distance between the two mobile devices is not below a distance threshold, the method loops back and makes another determination, if the distance between the two mobile devices is below a distance threshold, the method continued to the next step, driver determination step S18. The distance threshold is such as to make the determination that the second mobile device is in the same vehicle as the first mobile device.

In driver determination step S18, it is determined whether the first mobile device (4 of FIG. 1) is the driver's mobile device. This is determined by any suitable method, including determining the first mobile device's locational relationship to the second mobile device. For example, in countries where the driver seat is on the left hand side of the automobile and it is determined that the first mobile device is to the left of the second mobile device (as in a passenger seat), the first mobile device can be determined as the driver's device, and vice versa for countries where the driver seat is on the right hand side of the automobile.

As another example, if the first mobile device is closer to the front of the automobile than the second mobile device (as in a passenger in a rear seat), the first mobile device can be determined as the driver's device. As another suitable method, the driver can identify themselves to the first mobile device as the driver or have on, or in close proximity to, themselves a wearable piece of technology identifying them as a driver (such as a smart watch). As still another method, if the automobile is configured with sensing technology, the automobile itself could prompt the driver to identify themselves as the driver.

In the driver determination step S18, if the first mobile device is determined to not be a driver, the first mobile device ends the method. If the first mobile device is determined to be the driver, the method proceeds to trust determination step S20.

In trust determination step S20, it is determined whether the second mobile device is a trusted mobile device. In this step the first mobile device can include a listing of trusted devices or contacts (including telephone numbers or email addresses). If the second mobile device is not a trusted mobile device, the first mobile device ends the method. If the second mobile device is a trusted device, the first mobile device and the second mobile device pair to each other in step S22. This pairing allows for passage of notifications and any other suitable information between the first mobile device and the second mobile device. This pairing can occur as described above, prior to receipt of a notification by the first mobile device, or, pairing can occur after receipt of a notification by the first mobile device in step S24, discussed below. Pairing can be by any suitable technology such as by proximity, NFC or Bluetooth®. An authentication method can also be used in place of pairing.

In one embodiment, once the first mobile device and the second mobile device are paired, and prior to receipt of a notification by the first mobile device, the first mobile device provides access to the second mobile device to all notifications received by the first mobile device prior to pairing. In yet another embodiment, once the first mobile device and the second mobile device are paired, and prior to receipt of a notification by the first mobile device, the first mobile device provides access to the second mobile device to all unread notifications received by the first mobile device prior to pairing.

After the first mobile device and the second mobile device are paired, the first mobile device determines whether a notification has been received in notification receipt step S24. If a notification has not been received by the first mobile device, the method loops back and the first mobile device again determines if a notification has been received. In other embodiments, if a notification has not been received by the first mobile device, the method can loop back (not shown) to step S12 and continue again.

If a notification has been received by the first mobile device, the first mobile device determines if the sender's device (2 of FIG. 1) is blocked from transmission to the second mobile device in optional notification blocking step S26.

The first mobile device can optionally include a list of sender's devices or contact information (including phone number, email address) that block transmission of a notification from the first mobile device to the second mobile device. For example, the driver's first mobile device can block transmission of notifications to the second mobile device if the sender is a spouse and the second mobile device's owner is a parent of the driver. If the transmission of a notification from the first mobile device to the second mobile device is blocked because the sender is on the first mobile device's list of blocked senders for the second mobile device, the method ends and no notification is transmitted to the second mobile device. If the transmission of a notification from the first mobile device to the second mobile device is not blocked because the sender is not on the first mobile device's list of blocked senders for the second mobile device, the method continued to transmission step S28.

In transmission step S28 the notification sent from sender's device (2 OF FIG. 1) is transmitted from the first mobile device (4 of FIG. 1) to the second mobile device (6 of FIG. 1) without the first mobile device providing any notice or indication to the driver. This transmission from the first mobile device to the second mobile device can be accomplished in any suitable way, such as by a Bluetooth® transmission, NFC transmission, a text message or an email. The passenger's second mobile device then can verbally alert the passenger that a notification has been received through transmission from the first mobile device.

Once step S28 is complete the method can return to step S12 to determine if the first mobile device is above the motion threshold. If the motion is found not be above the threshold for a minimum amount to time, the vehicle is determined to of stopped and the method ends. As an example, once the driver reaches the destination and exits the automobile, their first mobile device would be below the motion threshold and would no longer proceed through the method or transmit notifications to the second mobile device.

Figure 3:
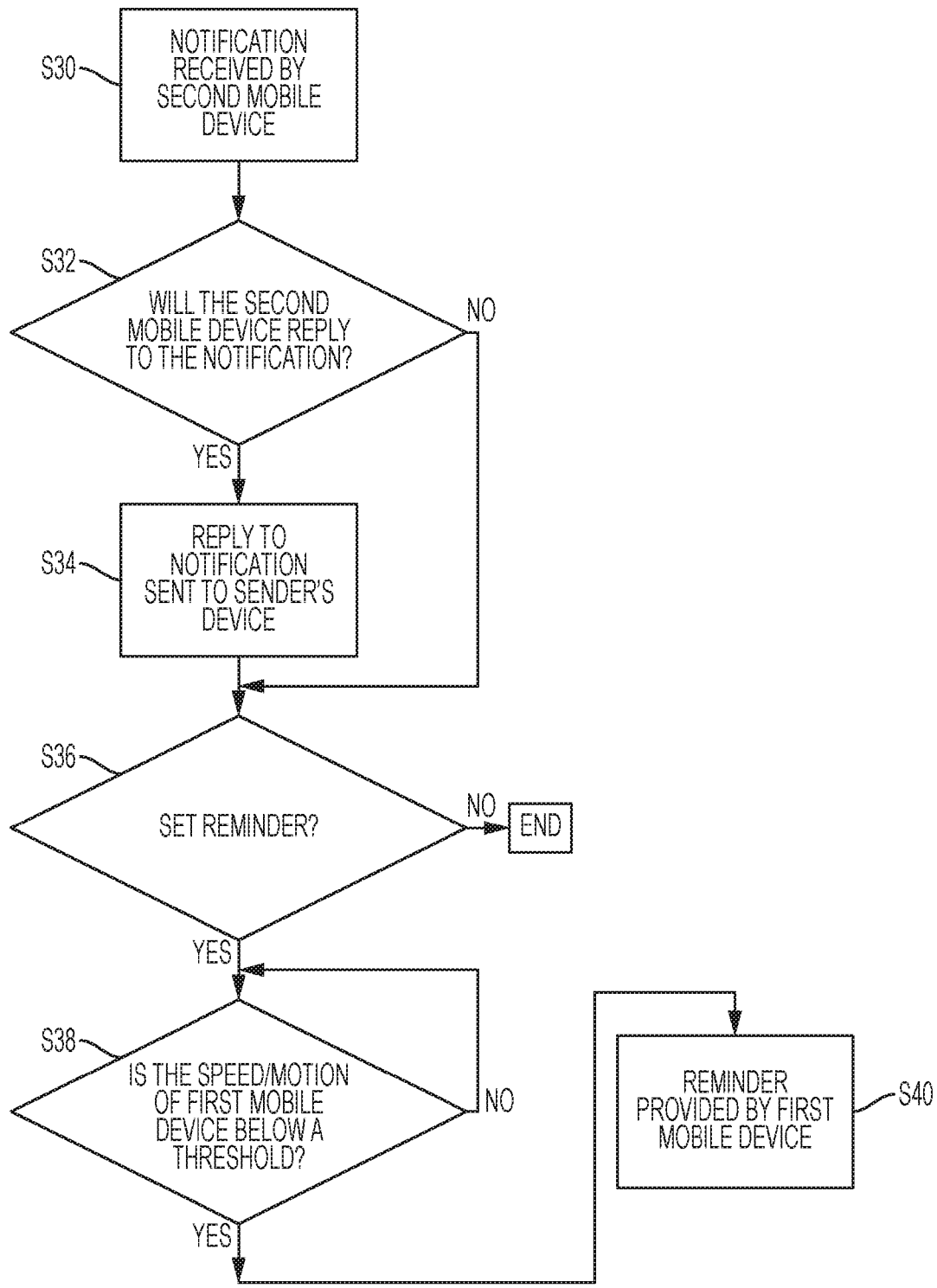
FIG. 3 is a flowchart including several optional steps of the method according to an embodiment of the present disclosure.

Also once step S28 is complete the method can optionally proceed as shown in FIG. 3 and discussed below.

FIG. 3 is a flowchart including several optional steps of the disclosed method. Initially, the notification transmitted from the first mobile device is received by the second mobile device in step S30. After receipt, the user of the second mobile device can choose to reply to the notification or to not reply in reply decision step S32. If no reply is made, the method skips a step and moves to reminder step S36. If a reply is made, the method moves to step S34, which replies to the notification sent directly back to the sender's device. The reply to the sender's device in step S34 can optionally include a message notifying the sender that the reply is being sent on behalf of the first mobile device.

Whether or not a reply is made to the sender's device, the method continues to reminder step S36. Reminder step S36 determines whether or not the first mobile device reminds the driver once they are no longer driving the automobile that a notification has been received from the sender's device. This reminder can optionally include notifications of any reply sent by the second mobile device on behalf of the first mobile device. Optionally, the second mobile device can include a prompt so that along with providing a reply, the second mobile device can also provide a reminder to the first mobile device. If no reminder is to be provided, the method ends. Also optionally, the reply sent by the second mobile device can be transmitted to the first mobile device alone, or the reply can be transmitted with the reminder to the first mobile device. If a reminder is to be provided the method proceeds to speed/motion threshold step S38.

To ensure that the driver's first mobile device does not remind the driver while still driving the automobile, the first mobile device only reminds the driver when the automobile is below at least one of a speed threshold and a motion threshold. In speed/motion threshold step S38 the first mobile device determines whether the automobile is below a motion threshold (such as in step S12 of FIG. 2 discussed above) and/or below a speed threshold (such as in step S14 of FIG. 2 discussed above). If the automobile is not below either a motion threshold or a speed threshold, the method loops back and the first mobile device again determines if the automobile is below a motion threshold and/or below a speed threshold. If the automobile is below either or both of a motion threshold and a speed threshold, the first mobile device reminds the driver that a notification has been received and optionally, whether the second mobile device provided any reply, in step S40.

Figure 4:
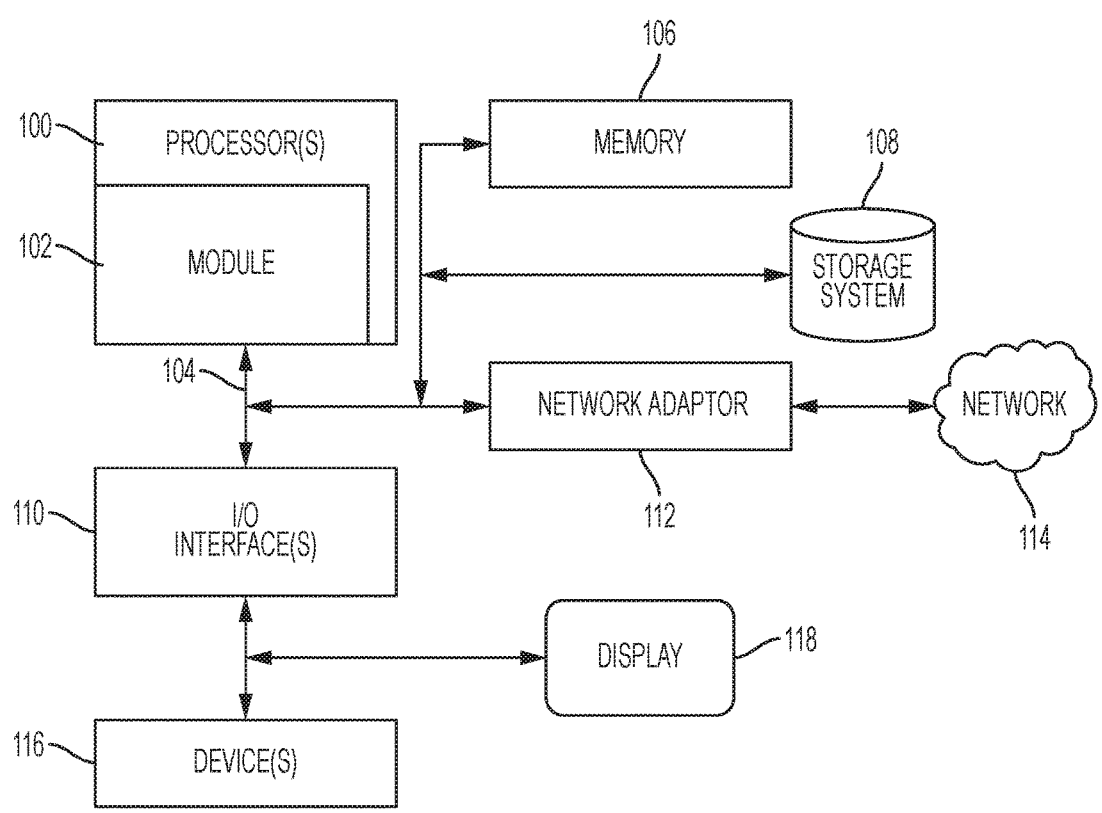
FIG. 4 illustrates a schematic of an example computer or processing system according to an embodiment of the present disclosure.

FIG. 4 illustrates a schematic of an example computer or processing system that may implement the method for providing notifications intended for a first mobile device to a trusted second mobile device in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage system 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for redirecting notifications comprising:
 determining that a first mobile device is in motion at a speed that exceeds a threshold value;
 determining that the while the first mobile device is in motion at a speed that exceeds the threshold value, the first mobile device is within a threshold distance of the second mobile device;
 receiving an input at the first mobile device identifying that the first mobile device is a mobile device of a driver of an automobile;
 determining that a second mobile device is in a position of a passenger of the automobile;
 pairing the first mobile device with the second mobile device in response to the first mobile device being determined as being in a position of the driver and in response to the second mobile device being in the position of the passenger;
 determining that a notification has been received by the first mobile device;
 automatically transmitting the notification from the first mobile device to the second mobile device, without providing an indication to a user of the first mobile device that the notification was received by the first mobile device; and
 transmitting a reply to the notification with a message that the reply is on behalf of a user of the first mobile device from the second mobile device, setting a reminder on the first mobile device that the notification was received, and transmitting the reply made by the second mobile device to the first mobile device.

2. The computer implemented method of claim 1, further comprising blocking an indication by the first mobile device that the notification has been received, and wherein the step of transmitting the notification to the second mobile device comprises determining that the second mobile device is a trusted mobile device of the first mobile device.

3. The computer implemented method of claim 1, further comprising determining that the first mobile device is moving at a speed below the threshold speed and providing a reminder that the notification was received.

4. The computer implemented method of claim 1, wherein the input is from a wearable device on the driver.

5. The computer implemented method of claim 1, wherein the input is from an interface on the first mobile device.

6. The computer implemented method of claim 5, wherein the input is prompted based on determining that the first mobile device is in a position of the driver.

7. A system for redirecting notifications, comprising:
 one or more computer readable storage devices having executable program instructions embodied therewith;
 one or more processors operably coupled to the one or more storage devices;
 one or more processors operable to determine that a first mobile device is in motion at a speed that exceeds a threshold value;
 one or more processors operable to determine that the while the first mobile device is in motion at a speed that exceeds the threshold value, the first mobile device is within a threshold distance of the second mobile device;
 one or more processors operable to receive an input at the first mobile device identifying that the first mobile device is a mobile device of a driver of an automobile;
 one or more processors operable to determine that a second mobile device is in a position of a passenger of the automobile;
 one or more processors operable to pair the first mobile device with the second mobile device in response to the first mobile device being determined as being in a position of the driver and in response to the second mobile device being in the position of the passenger;
 one or more processors operable to determine that a notification has been received by the first mobile device;
 one or more processors operable to automatically transmitting the notification from the first mobile device to the second mobile device, without providing an indication to a user of the first mobile device that the notification was received by the first mobile device; and
 one or more processors operable to transmit a reply to the notification with a message that the reply is on behalf of a user of the first mobile device from the second mobile device, set a reminder on the first mobile device that the notification was received, and transmit the reply made by the second mobile device to the first mobile device.

8. The system of claim 7, further comprising one or more processors operable to determine that the second mobile device is a trusted mobile device of the first mobile device and to block an indication by the first mobile device that the notification has been received.

9. The system of claim 7, further comprising one or more processors operable to determine that the first mobile device is moving at a speed below the threshold speed and one or more processors operable to provide a reminder that the notification was received.

10. The system of claim 7, wherein the input is from a wearable device on the driver.

11. The system of claim 7, wherein the input is from an interface on the first mobile device.

12. The system of claim 11, wherein the input is prompted based on determining that the first mobile device is in a position of the driver.

13. A computer readable storage medium storing a program of instructions executable by a machine to perform a method of redirecting notifications, the method comprising:
 determining that a first mobile device is in motion at a speed that exceeds a threshold value;

determining that the while the first mobile device is in motion at a speed that exceeds the threshold value, the first mobile device is within a threshold distance of the second mobile device;

receiving an input at the first mobile device identifying that the first mobile device is a mobile device of a driver of an automobile;

determining that a second mobile device is in a position of a passenger of the automobile;

pairing the first mobile device with the second mobile device in response to the first mobile device being determined as being in a position of the driver and in response to the second mobile device being in the position of the passenger;

determining that a notification has been received by the first mobile device;

automatically transmitting the notification from the first mobile device to the second mobile device, without providing an indication to a user of the first mobile device that the notification was received by the first mobile device; and transmitting a reply to the notification with a message that the reply is on behalf of a user of the first mobile device from the second mobile device, setting a reminder on the first mobile device that the notification was received, and transmitting the reply made by the second mobile device to the first mobile device.

14. The computer readable storage medium of claim 13, further comprising determining that the first mobile device is moving at a speed below the threshold speed and providing a reminder that the notification was received, and wherein the step of transmitting the notification to the second mobile device comprises determining that the second mobile device is a trusted mobile device of the first mobile device.

15. The computer readable storage medium of claim 13, wherein the input is from a wearable device on the driver.

16. The computer readable storage medium of claim 13, wherein the input is from an interface on the first mobile device.

17. The computer readable storage medium of claim 16, wherein the input is prompted based on determining that the first mobile device is in a position of the driver.

\* \* \* \* \*